(12) United States Patent
Courage et al.

(10) Patent No.: US 9,613,379 B2
(45) Date of Patent: Apr. 4, 2017

(54) TRADER PORTAL SYSTEM AND METHOD

(71) Applicant: JPMorgan Chase Bank, N.A., New York, NY (US)

(72) Inventors: Miles Courage, Hampshire (GB); Ken C. Janssens, London (GB); Jeremy Dobrick, London (GB)

(73) Assignee: JPMorgan Chase Bank, N.A., New York, NY (US)

( * ) Notice: Subject to any disclaimer, the term of this patent is extended or adjusted under 35 U.S.C. 154(b) by 228 days.

(21) Appl. No.: 14/191,521

(22) Filed: Feb. 27, 2014

(65) Prior Publication Data

US 2014/0180899 A1 Jun. 26, 2014

Related U.S. Application Data

(63) Continuation of application No. 12/410,716, filed on Mar. 25, 2009, now Pat. No. 8,700,441.

(51) Int. Cl.
*G06Q 40/00* (2012.01)
*G06Q 40/04* (2012.01)
*G06Q 10/06* (2012.01)
G06Q 40/06 (2012.01)

(52) U.S. Cl.
CPC ....... *G06Q 40/04* (2013.01); *G06Q 10/06315* (2013.01); *G06Q 40/06* (2013.01)

(58) Field of Classification Search
CPC ............................... G06Q 40/04; G06Q 40/06

USPC ................................................. 705/37, 36 R
See application file for complete search history.

(56) References Cited

U.S. PATENT DOCUMENTS

| | | | |
|---|---|---|---|
| 6,408,282 B1* | 6/2002 | Buist | G06Q 40/06 705/36 R |
| 2004/0003347 A1* | 1/2004 | Saidenberg | G06F 17/24 715/255 |
| 2009/0307054 A1* | 12/2009 | D'Imporzano | G06Q 10/06393 705/7.29 |

* cited by examiner

*Primary Examiner* — Hunter Wilder
(74) *Attorney, Agent, or Firm* — Goodwin Procter LLP

(57) ABSTRACT

Embodiments of the invention are directed to a computer-implemented trader portal system and method for use within a trading organization supporting multiple traders. The trader portal system integrates available trader related resources from multiple sources for trader viewing and utilization. The trader portal system may include administrative controls for allowing administrative configuration of the trader related resources visible to the multiple traders within the trading organization. The trader portal system may further include a source collection engine for collecting the trader-related resources from the multiple sources and a source integration engine for integrating the collected trader related resources with the trader portal system in accordance with the administrative configuration. The trader portal system may further include multiple modules accessible to the traders through a user interface, each of the multiple modules displaying at least one of the collected trader related resources as determined by the source integration engine.

16 Claims, 12 Drawing Sheets

Main Menu                                                              Ken Janssens  24 April 2008

— Home    Stripes    Administration
          Hello      My Client Value    ▲
          Zebra      My Risk
                     My P&L Estimates — 730
          Please     My Funding
                     My Projects       ▲
                     My Priorities
                     My Trade Ideas
                     My News           ▲
                     My Leave
                     My Estimates      ▲
                     GEM Information   ▲

710
720
702

Estimates
Estimate Date  24 April 2008              Trader  Abraham Berkowicz        Desk
                                                                           Business Review Item
Comments

| | Spot | Measure2 | Measure3 | Measure4 | Measure1 | Comments | Update User | Update Time |
|---|---|---|---|---|---|---|---|---|
| USA | ☐ | ☐ | ☐ | ☐ | ☐ | ☐ | ☐ | ☐ |
| ZAR | ☐ | ☐ | ☐ | ☐ | ☐ | ☐ | ☐ | ☐ |
| EUR | ☐ | ☐ | ☐ | ☐ | ☐ | ☐ | ☐ | ☐ |
| HKD | ☐ | ☐ | ☐ | ☐ | ☐ | ☐ | ☐ | ☐ |
| USD | ☐ | ☐ | ☐ | ☐ | ☐ | ☐ | ☐ | ☐ |
| USD1 | ☐ | ☐ | ☐ | ☐ | ☐ | ☐ | ☐ | ☐ |
| USD2 | ☐ | ☐ | ☐ | ☐ | ☐ | ☐ | ☐ | ☐ |
| zar1 | ☐ | ☐ | ☐ | ☐ | ☐ | ☐ | ☐ | ☐ |
| Totals | | | | | | | | |

Save
Clear
Submit
Totals

TRADER PORTAL SYSTEM AND METHOD

REFERENCE TO RELATED APPLICATIONS

The present application claims priority to, and is a continuation of, U.S. patent application Ser. No. 12/410,716, filed on Mar. 25, 2009, entitled, "Trader Portal System and Method," which is incorporated herein by reference in its entirety.

TECHNICAL FIELD

Embodiments of the invention are related generally to systems and methods for operating a trader portal. In particular, embodiments of the invention relate to a trader portal that allows traders access to multiple distributed systems through a single desktop location.

BACKGROUND OF THE INVENTION

Typically, during a trader's day, the trader not only performs trades, but also considers factors such as risk factors, profit and loss statements, client value, etc. During a typical trading day, a trader may want to sign off on risk numbers, share an idea with sales, or obtain news regarding ongoing trading projects. Currently, in order to consider these factors or perform these tasks, traders are required to access multiple internal and/or external systems or sources to locate the required information. In some instances, traders may be required to log into and out of the same system multiple times during a day of trading. The number of systems may vary from a few systems to several dozen systems or more. The time and inconvenience to the trader due to the necessity for repeatedly accessing multiple systems may greatly hinder daily efficiency.

With advances in software and available online resources, an increasing number of trader tasks are performed electronically through the use of a trader's computer. In fact, even the trading itself is often conducted electronically through a virtual marketplace. Many investment firms on both the buy and sell side are increasing their investment in systems and technology for electronic trading. Traders are increasingly relying on electronically transmitted information to analyze market conditions and execute orders.

Participants in electronic financial markets typically include hedge funds, pension funds, mutual funds and other institutional traders. Through electronic financial markets, these traders are able to make decisions to initiate orders based on electronically received information that in some instances may be available electronically before it is available to human traders. Furthermore, electronic trading facilitates division of large trades into multiple smaller trades in order to manage cost and risk.

Traders may find algorithms and other tools offered by different brokers that are useful for specific situations in accordance with objectives of portfolio managers. Objectives may include making a predetermined purchase, minimizing timing risk, minimizing market risk, a combination of these objectives, or other objectives. Traders, in order to accomplish pre-defined objectives, aim to access multiple different tools and resources that are electronically available. Furthermore, aside from making trades, traders may require access to organizational information. Fore example, traders may need to locate personnel within the organization, locate a meeting room, or determine a co-worker's schedule, or perform other tasks related to the trader's daily business, but outside of the scope of performing actual trades.

Currently, in order to perform tasks necessary during a trading day, traders are required to access multiple internal and/or external systems to locate the required information. In some instances, traders may be required to log into and out of the same systems multiple times during a day of trading, thus creating impediments to performing efficiently.

One solution to the problem of accessing disparate resources for separate tasks is to create a single system having all of the functionality of the multiple disparate systems combined into one system. However, attempts at creating such integrated systems generally result in systems that fall far short of the capabilities provided by the multiple disparate resources. Furthermore, such integrated systems are generally costly both to create and to maintain.

A solution is needed that simplifies trader workflow by allowing traders to use these multiple disparate systems without repeatedly switching between systems and logging into and out of various servers and systems.

SUMMARY OF THE INVENTION

In one aspect of the invention, a computer implemented trader portal system is provided for use within a trading organization supporting multiple traders. The trader portal system integrates available trader related resources from multiple sources for trader viewing and utilization. The trader portal system may include administrative controls for allowing administrative configuration of the trader related resources visible to the multiple traders within the trading organization and a source collection engine for collecting the trader related resources from the multiple sources. The multiple sources may include at least one internal source, the internal source disposed inside of the trading organization and accessed over a first network, and at least one external source located externally of the trading organization and accessed over a second network. The trader portal system may further include a source integration engine for integrating the collected trader related resources with the trader portal system in accordance with the administrative configuration. Additionally, the trader portal system may include multiple modules accessible to the traders through a user interface, each of the multiple modules displaying at least one of the collected trader related resources as determined by the source integration engine.

In a further aspect of the invention, a computer-implemented method is provided for operating a trader portal system for use within a trading organization supporting multiple traders. The trader portal system may integrate available trader related resources from multiple sources for trader viewing and utilization. The method of operating the trader portal system may include processing settings from administrative controls for allowing administrative configuration of the trader related resources visible to the multiple traders within the trading organization. The method may further include collecting the trader related resources from the multiple sources, the sources including at least one internal source, the internal source disposed inside of the trading organization and accessed over a first network, and at least one external source located externally of the trading organization and accessed over a second network. Additionally, the method may include integrating the collected trader related resources with the trader portal system in accordance with the administrative configuration and providing the traders with access to the integrated trader related resources through multiple modules accessible to the traders through a user interface, each of the multiple modules displaying at least one of the integrated trader related resources.

In an additional aspect of the invention, a computer-implemented trader portal system is provided for use within a trading organization supporting multiple traders. The trader portal system may be operative for integrating available trader related resources from multiple sources for trader viewing and utilization and may include administrative controls for allowing administrative configuration of the trader related resources visible to the multiple traders within the trading organization. The trader portal system may also include a source collection engine for collecting the trader related resources from the multiple sources and a source integration engine for integrating the collected trader related resources with the trader portal system in accordance with the administrative configuration. The trader portal system may additionally include multiple modules accessible to the traders through a user interface, each of the multiple modules displaying at least one of the collected trader related resources as determined by the source integration engine, the multiple modules including a client value module, a risk module, and a funding module.

BRIEF DESCRIPTION OF THE DRAWINGS

The present invention is described in detail below with reference to the attached drawings figures, wherein:

FIG. 6 is a user interface illustrating implementation of a client value module of a trader portal system in accordance with an embodiment of the invention;

FIG. 7 is user interface illustrating implementation of a profit and loss module of a trader portal system in accordance with an embodiment of the invention;

DETAILED DESCRIPTION OF PREFERRED EMBODIMENTS

Embodiments of the present invention are directed to a trader portal system that receives feeds from numerous different internal and external systems and provides the user with access to these feeds. For instance, the trader portal system may include a user interface that provides trader access to "my risk" module, "my profile" module, and "my client value" module and other modules. By accessing a module, the trader is able to access the information received from external and internal systems or sources. In embodiments of the invention, each module may be accessed by a trader through a dropdown menu of options. When a dropdown menu is selected, a further customizable screen may appear that allows a trader to select areas of interest. The user interface representation may be provided so as to ensure efficient management of screen space.

Figure 1A:
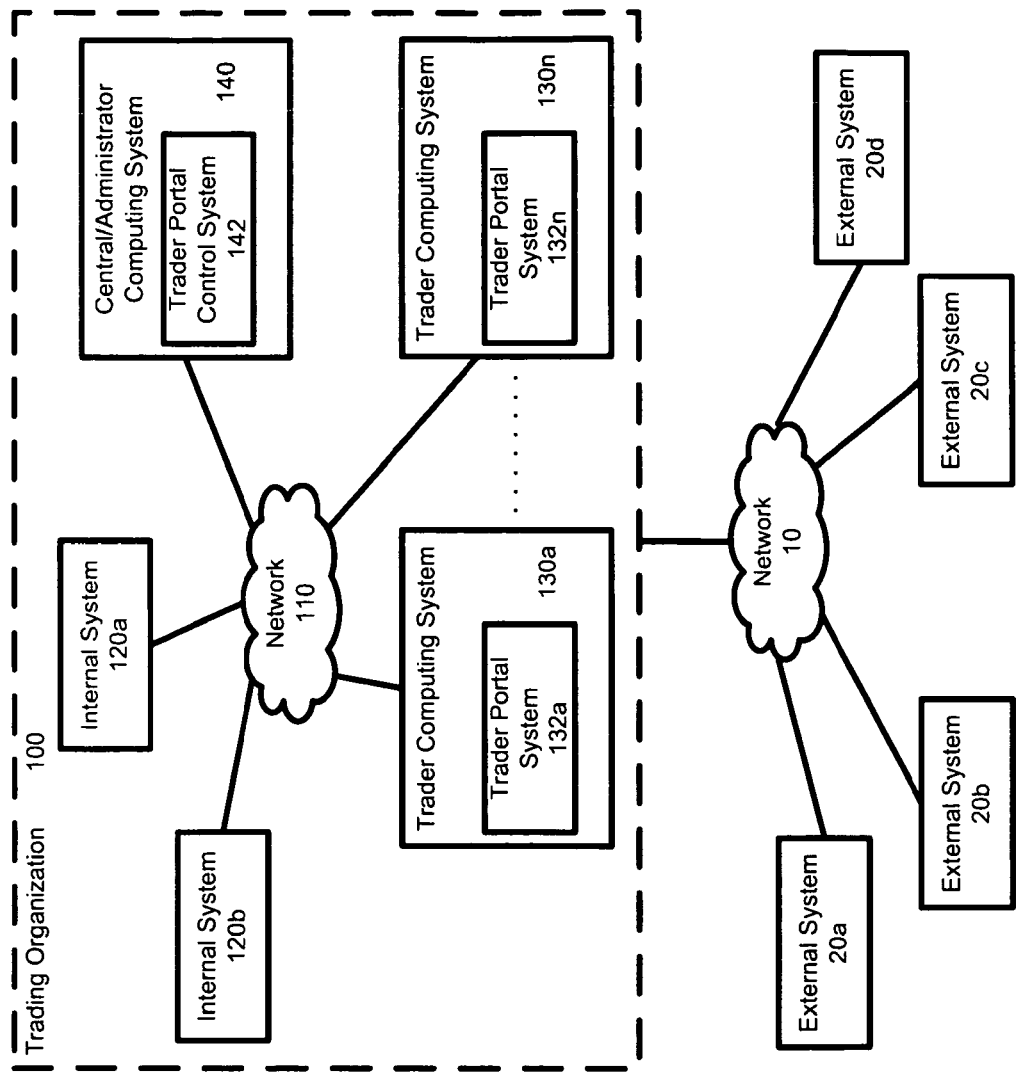
FIG. 1A is a block diagram illustrating an operating environment for trader portal system in accordance with an embodiment of the invention.

FIG. 1A is a block diagram illustrating an operating environment for trader portal system in accordance with an embodiment of the invention. A trading organization 100 may be connected over a network 10 with a plurality of external systems 20a, 20b, 20c, and 20d. Although four external systems are shown, the environment may include various numbers of external systems, such as hundreds of external systems.

The external systems 20a-d may include technology firm computing devices, market data sources such as Reuters™, news sources such as Bloomberg™, exchanges, search services such as Lexis Nexi™, remote trader desks, or other useful external systems. For example, external systems such as market data sources may provide pricing and other market information in real time through the trader portals 132a . . . 132n. The external systems 20a-20d could also include other types of data sources such as email messages or file transfers. The external systems 20a-20d may further transmit information from paper tickets or spreadsheets.

The network 10 for connecting the components of the trading organization 100 with the external systems 20a-20d could be any known type of network for connecting computing systems, but is preferably the Internet.

Within the trading organization 100, a central/administrator computing system 140 including a trader portal control system 142 may be connected over a network 110 with internal systems 120a and 120b and may further be connected with trader computing systems 130a . . . 130n. Each trader computing system 130a . . . n may include a trader portal system 132a . . . 132n. As set forth above with respect to the external systems, any number of internal systems, trader computing systems, and administrator computing systems may be present.

The internal systems may be or include similar systems to those described above with relation to the external systems 20a-20d. The internal systems 120a, 120b may further include databases including corporate and trader information. The internal systems may for example include Verve™ or Artemis™ that are used to provide client value information that helps traders to identify sales generated revenue and high value clients. Additionally, internal systems such as IRFE™, Kapital™, and Concorde™ can be used for trade capture for vanilla derivatives, exotic derivatives, and fixed income bonds, respectively. These are merely examples of available trading resources and the list should not be considered exhaustive. Other internal systems, such as Trader FE™, P&L Browser™, and Emerge™ may be implemented to consolidate risk management and profit and loss data from systems such IRFE™, Kapital™, Concorde™, or other available systems. Internal news or research sites may also be implemented. The network 110 may be or include a LAN or an Intranet or other type of network. The trader computing systems 130a . . . n as well as the central/administrator computing system 140 may be any of the known types of computing systems as will be further described below.

The trader portal control system 142 may include administrator controls that may allow administrators to determine which resources reach the trader portal systems 132*a* . . . 132*n*. The trader portal control system 142 may further include all of the features of the trader portal systems 132 and may function in a similar manner.

Figure 1B:
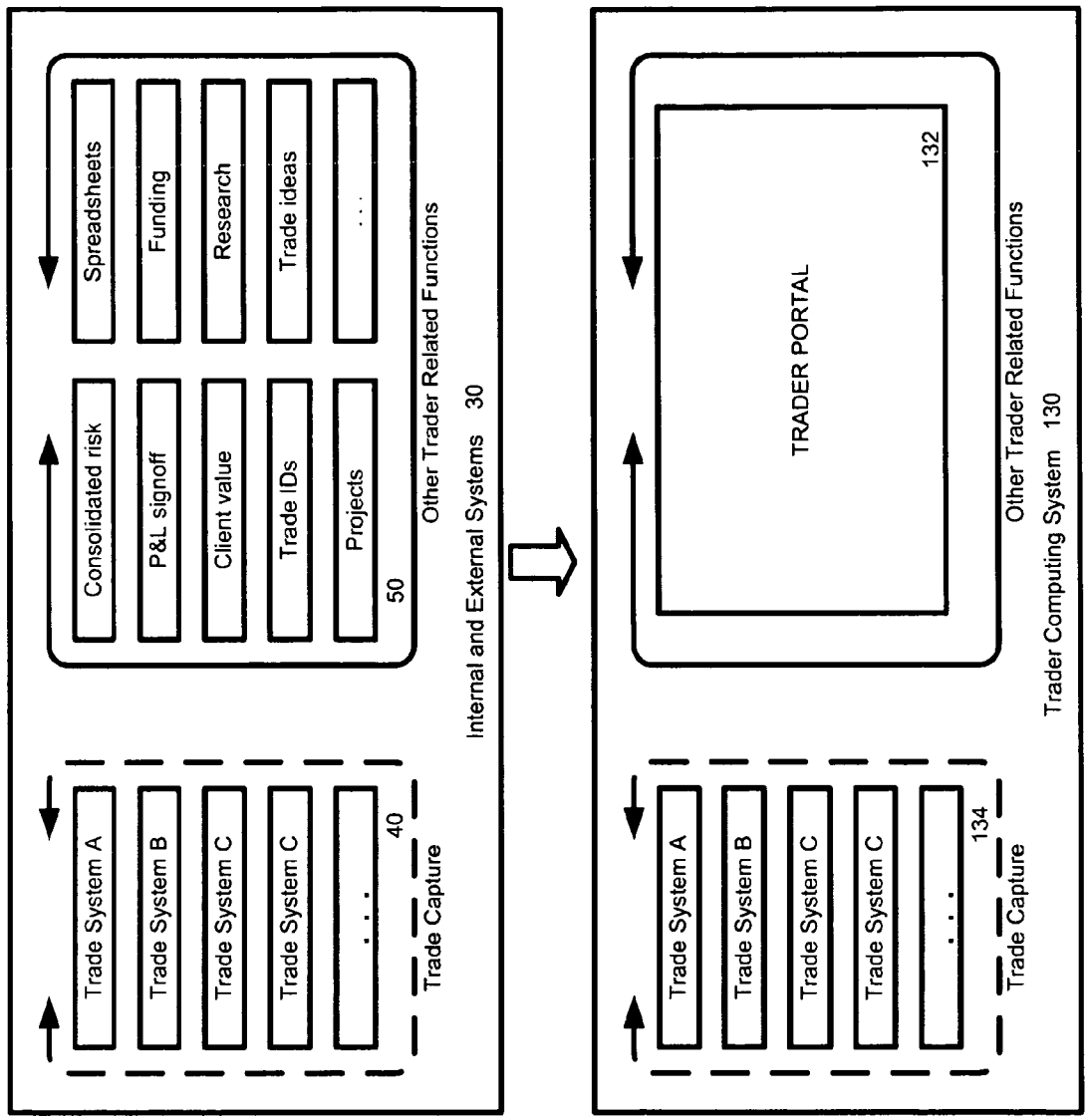
FIG. 1B is a block diagram illustrating information flow in accordance with an embodiment of the invention.

FIG. 1B illustrates information flow in accordance with an embodiment of the invention. Internal and external systems 30 may make available the information as described above. The internal and external systems may include both trading systems 40 and systems providing other trade related functions 50. The trader computing system 130 may collect trading system functionality 134 directly from the trading systems 40. In order to capture all of the other diverse trade related functions 50, the trader portal 132 operates to provide this functionality to the trader computing system 130. As illustrated, the trade related functionality 50 may include consolidated risk information, profit and loss signoff interfaces, client value information, trade identifiers, project information, spreadsheets, funding information, research tools, trade ideas, and other resources. This list is merely exemplary and should not be viewed as limiting.

Figure 2:
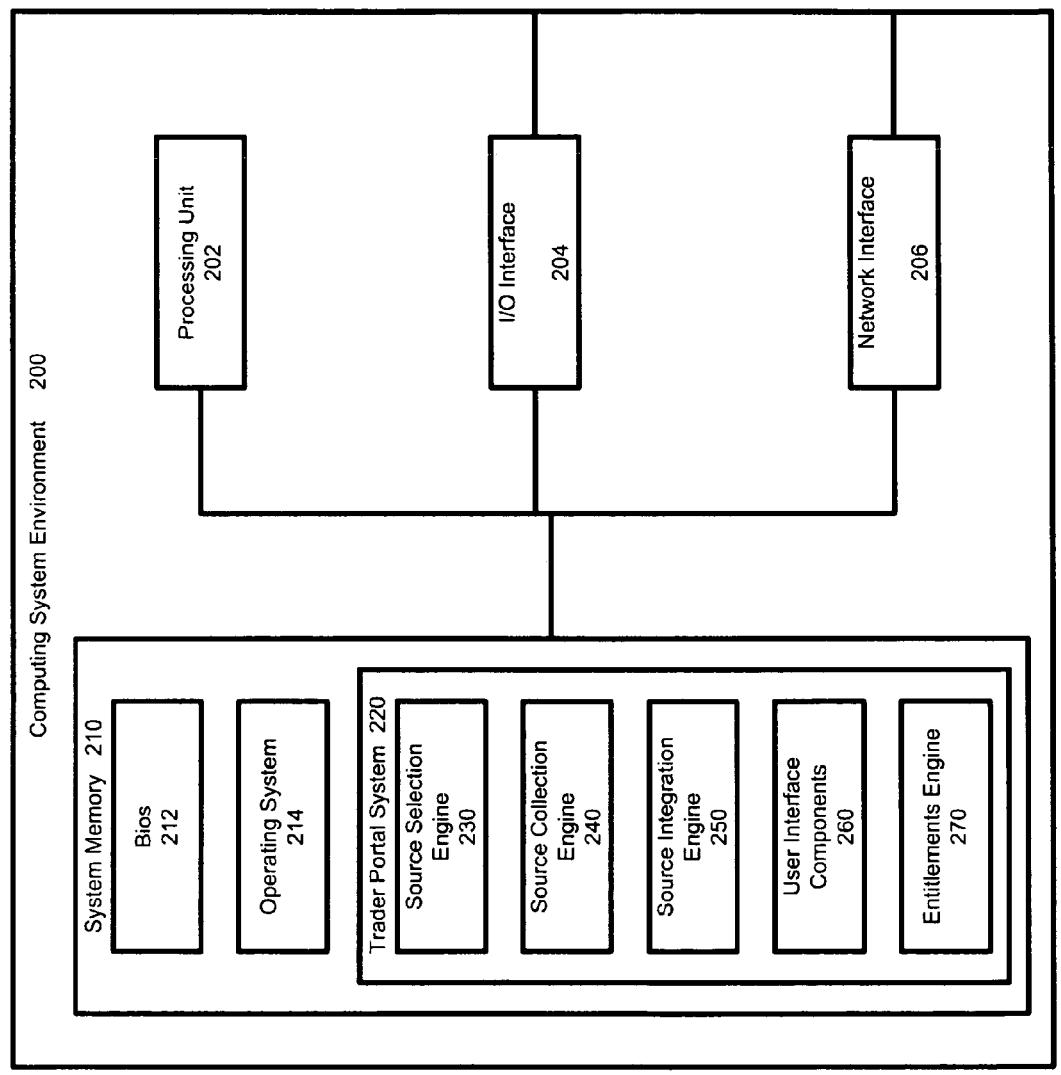
FIG. 2 illustrating a computing system environment for a trader portal system accordance with an embodiment of the invention.

FIG. 2 illustrates a computing system environment 200 for a trader portal system 220 in accordance with an embodiment of the invention. The computing system environment may include a processing unit 202 and various interfaces, such as for example an I/O interface 204 and a network interface 206. A system memory 210 may include ROM and RAM and a Basic Input Output System (BIOS) 212 and an operating system 214. Other computing components may also be included.

The trader portal system 220 may include a source selection engine 230, a source collection engine 240, a source integration engine 250, user interface components 260, and an entitlements engine 270. The source selection engine 230 may operate in response to the administrative controls to select sources and may further allow a trader to individually further customize the trader portal experience by selecting resources for viewing through the trader portal system 220. The source collection engine 240 may access external and internal sources and the source integration engine 250 may integrate these sources with user interface components 260 for viewing through modules of the trader portal system 220. The modules will be further described below with reference to FIG. 3.

The entitlements engine 270 may be provided to regulate collection of third party market data by a system of pre-set entitlements. The entitlements as dictated by the entitlements engine 270 may be set through the trader portal control system 142, which may be customizable for setting entitlements for market data. In alternative embodiments, individual traders may be authorized to set entitlements through the entitlements engine 270 of the trader portal system 220. The entitlements engine 270 may be built into the trader portal system or alternatively may be accessible as a separately provided portable option.

Thus, through incorporation of the entitlements engine 270, authorized traders accessing the trader portal system 220 would thus be automatically able to access the information in accordance with their entitlements. However, the source selection engine 230 may be provided to offer further customization opportunities from the desk of the trader.

Figure 3:
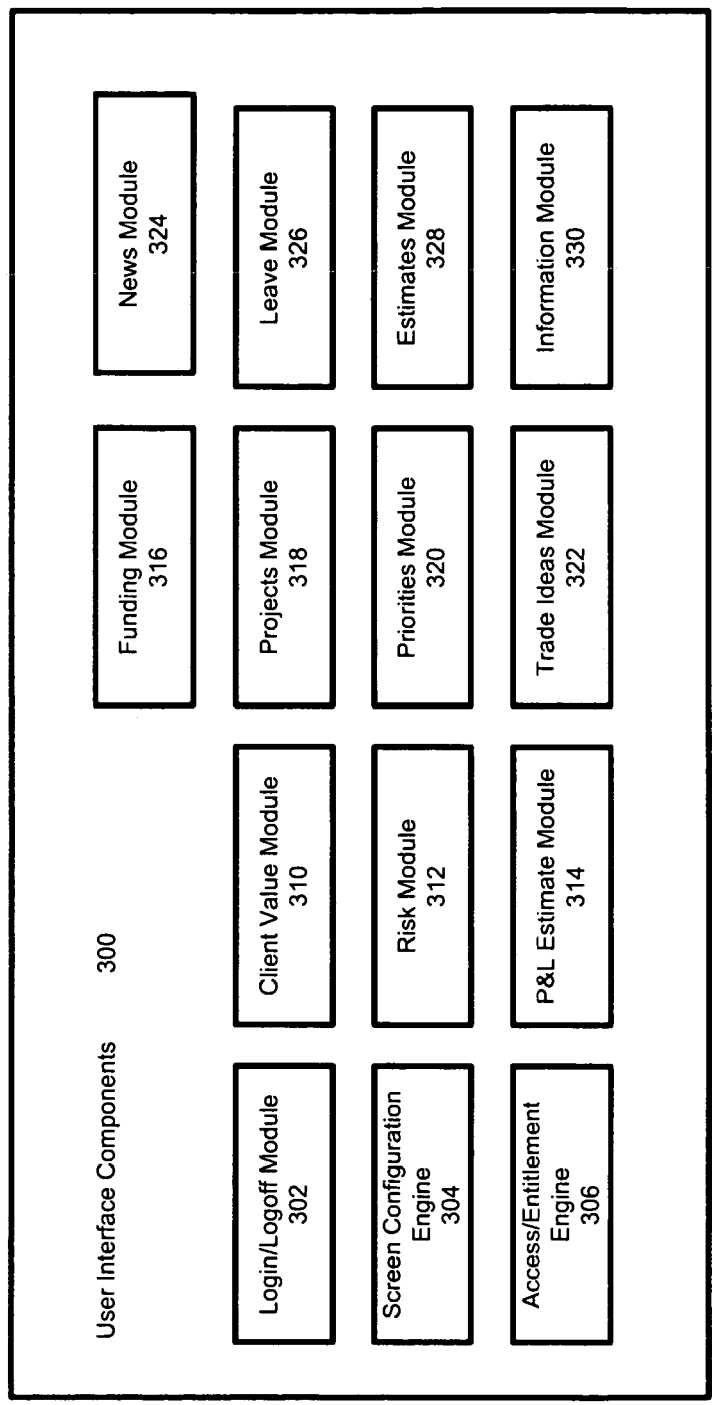
FIG. 3 is a block diagram illustrating modules for use in a trader portal system in accordance with an embodiment of the invention.

FIG. 3 is a block diagram illustrating user interface components 300 including modules for use in a trader portal system in accordance with an embodiment of the invention. As will be further described below in connection with FIGS. 4-10, each of the included modules may be represented by a stripe or selectable option on a drop down menu. Each module may receive a feed from a different source in order to provide traders with required information. Some modules may receive feeds of resources from the same source, but may draw different data or resources from the source and thus provide different data to the trader depending on the trader's selection. The sources may be systems or they may include other traders or trading desks. The trader portal system may accept input from emails, or paper tickets, and may further have a spreadsheet function to integrate input spreadsheets.

The user interface components 300 may include a login/logoff module 302, a screen configuration engine 304, and an access/entitlement engine 306. The user interface components 300 may additionally include a client value module 310, a risk module 312, a profit and lost estimate module 314, a funding module 316, a projects module 318, a priorities module 320, a trade ideas module 322, a news module 324, a leave module 326, an estimates module 328, and an information module 330. Furthermore, the user interface components 300 may be configured to easily incorporate additional modules. Each of these modules will be further described below in connection with FIGS. 4-10.

The components shown in FIGS. 1-3 above may be or include a computer or multiple computers. Although the components are shown as discrete units, all components may be interconnected or combined. The components may be described in the general context of computer-executable instructions, such as program modules, being executed by a computer. Generally, program modules include routines, programs, objects, components, data structures, etc. that perform particular tasks or implement particular abstract data types.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

The computer system may include a general purpose computing device in the form of a computer including a processing unit, a system memory, and a system bus that couples various system components including the system memory to the processing unit.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system of platform.

At a minimum, the memory includes at least one set of instructions that is either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. The data exchange management system 200 may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript for example. Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

Figure 4:
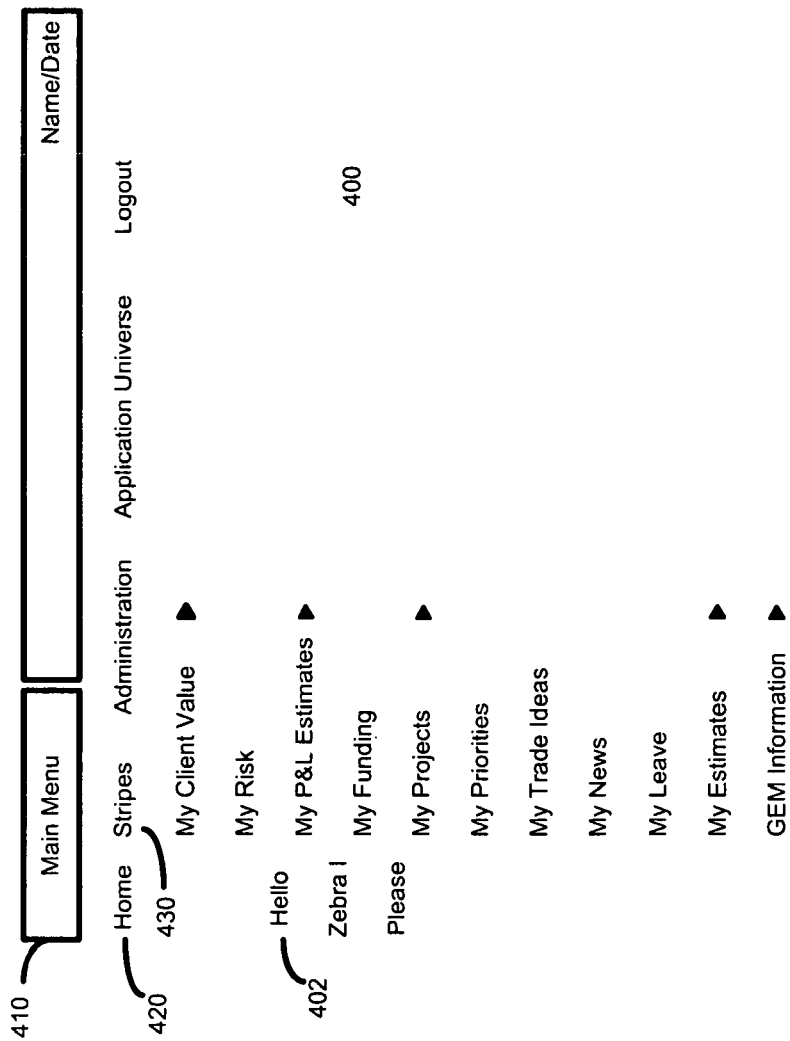
FIG. 4 is a user interface illustrating components of a trader portal system in accordance with an embodiment of the invention.

FIG. 4 is a user interface 400 illustrating components of a trader portal system in accordance with an embodiment of the invention. To access the user interface 400, the user may implement login/logoff module 302 of FIG. 3. In embodiments of the invention, once a system is initialized, logon and logoff may occur automatically. Screen real estate is extremely valuable and thus the interface 400 may be designed to minimize clutter. In embodiments of the invention, the user interface 400 may incorporate a sidebar for displaying key elements. Furthermore, since many system users may be mobile users, the user interface 400 needs to be adaptable to accommodate mobile devices or an alternative configuration may be offered for mobile users. The user interface 400 may include a welcome message 402 and may further include a main menu 410 and a toolbar 420 including modules 430 designated by a plurality of stripes.

Figure 5:
FIG. 5 is a selectable user interface screen for a trader portal system in accordance with an embodiment of the invention.

FIG. 5 is a selectable user interface screen 500 for a trader portal system in accordance with an embodiment of the invention. The user interface screen 502 may include various lines of business 502. A list of businesses 520 each may be preceded by a checkbox 510 so that the business may be selected or deselected. Using this list of checkboxes, traders can individually customize their own user experiences by selecting items of interest. These selections may be implemented by the screen configuration engine 304 and/or the access entitlement engine 306 to further customize the trader experience.

Figure 6:
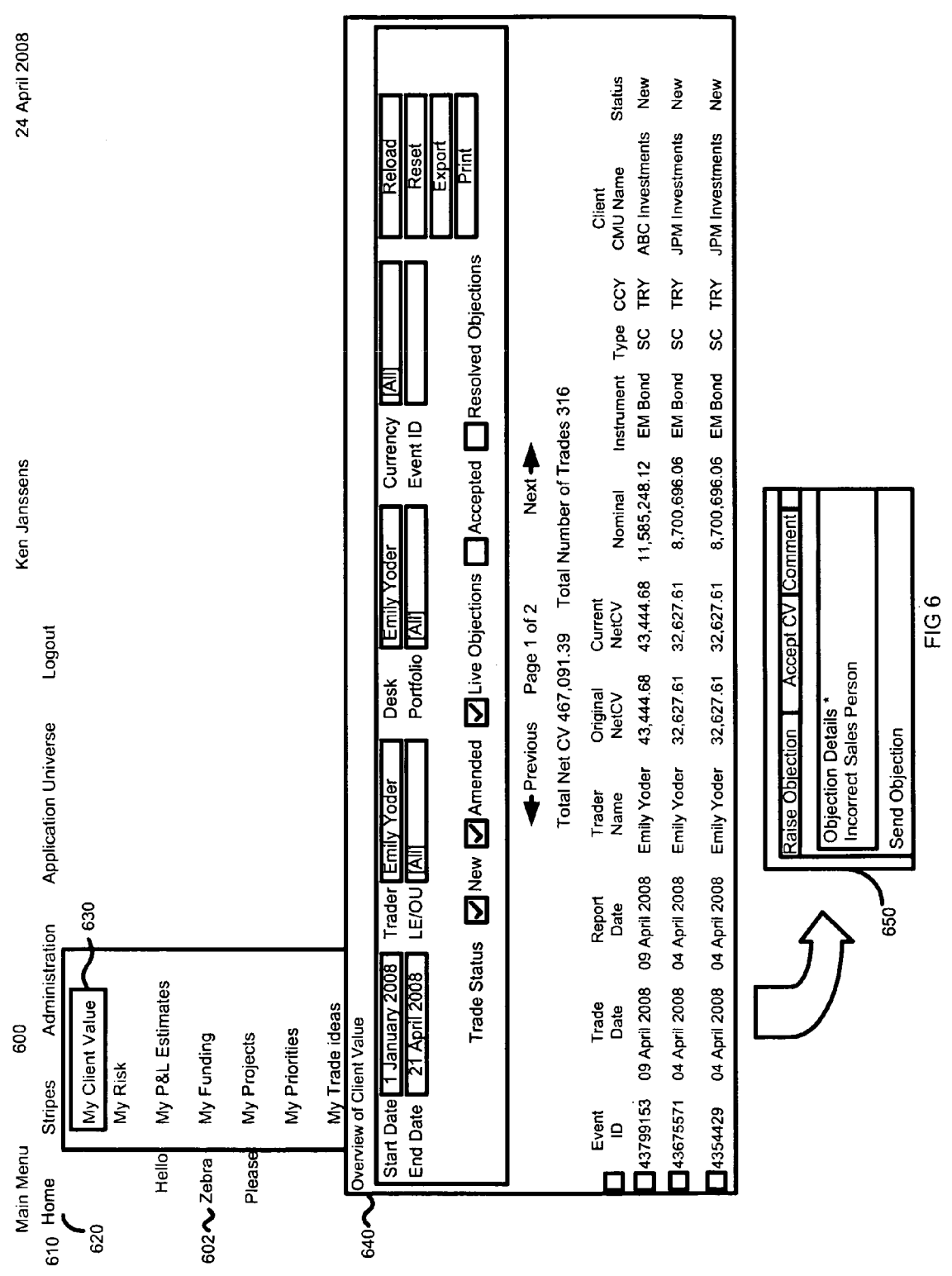

FIG. 6 is a user interface 600 including a main menu 610 and a welcome message 602. A toolbar 620 provides access to a client value module 630. When the client value module 630 is selected, user interface screens 640 and 650 may be displayed. The client value module may receive a daily feed from a source such as Verve™ or Artemus™ so that traders can review client value through the user interface screen 640 and raise any objections through the user interface screen 650. In addition to providing information, the trader portal system may also facilitate management of trades and research. For instance, with the client value module 630, traders may be able to access information regarding a particular trade, such as spread, profit, commission, etc.

FIG. 7 is user interface illustrating implementation of a profit and loss module 730 of a trader portal system in accordance with an embodiment of the invention. The user interface 700 includes a main menu 710, a welcome message 702, and a toolbar 720 for accessing multiple modules. The selection of the profit and loss module 730 causes a user interface 740 to be viewed. The user interface 740 may allow for submission of profit and loss estimates and comparison with actual values.

Figure 8:
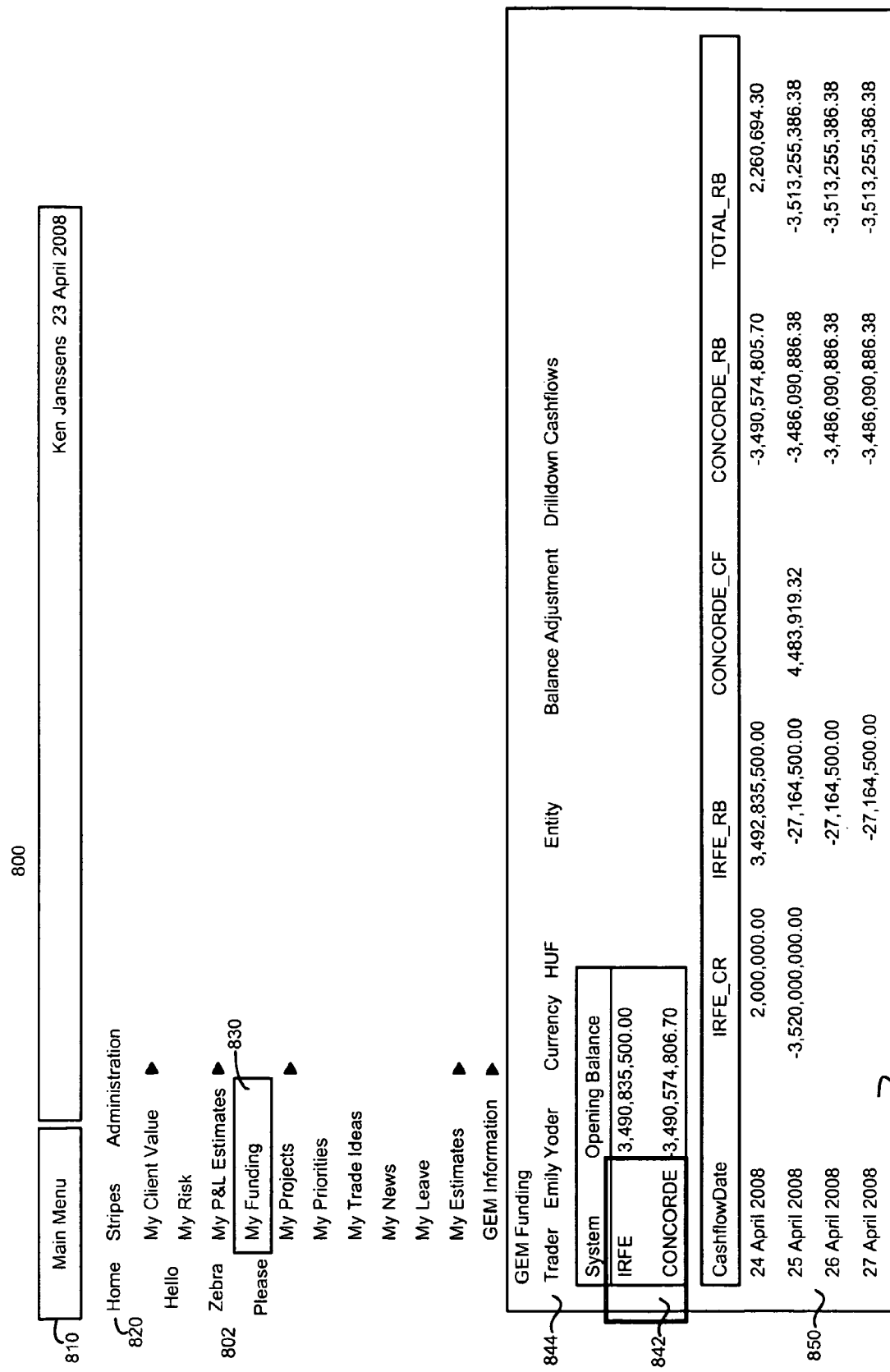
FIG. 8 is a user interface illustrating implementation of a funding module of a trader portal system in accordance with an embodiment of the invention.

FIG. 8 is a user interface 800 illustrating implementation of a funding module 830 of a trader portal system in accordance with an embodiment of the invention. A main menu 810, welcome message 802, and toolbar 820 are provided. The toolbar 820 may allow selection of a funding module 830. Selection of the funding module 830 may allow viewing of a user interface 840. The user interface 840 may identify a trader 844, a system or systems 842, and may provide funding data 850. The systems 842 may include for example IRFE™, Kapital™, and/or Concorde™.

Figure 9:
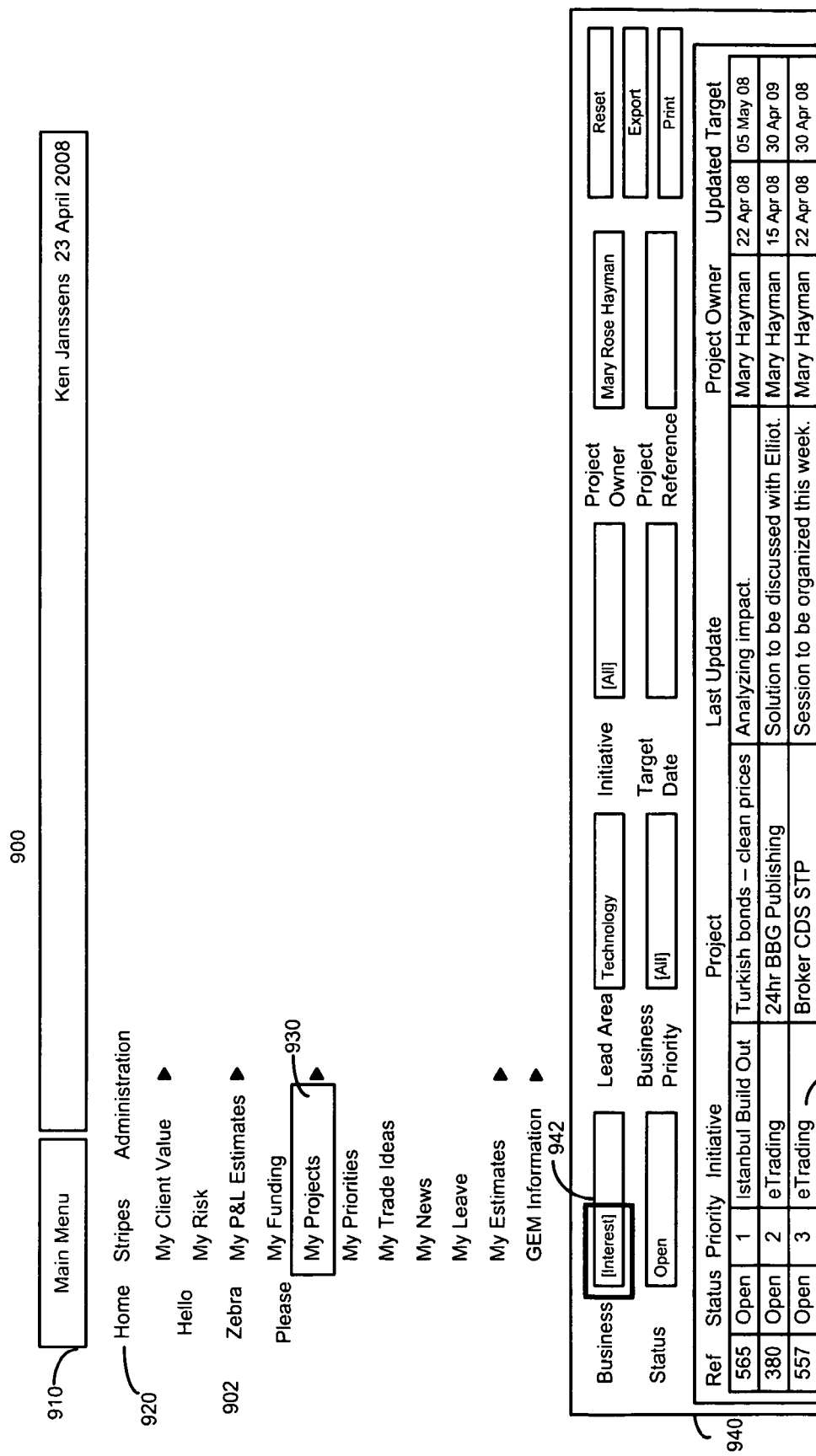
FIG. 9 is a user interface illustrating implementation of a project module of a trader portal system in accordance with an embodiment of the invention.

FIG. 9 is a user interface 900 illustrating implementation of a project module 930 of a trader portal system in accordance with an embodiment of the invention. The user interface 900 may include a main menu 910, toolbar 920, and welcome message 902. Selection of the project module 930 may generate a user interface screen 940. The user interface screen 940 may identify a business 942 and provide data 950 that allows a user to view the latest progress of projects of interest to the user. The projects may exist across operations, technology, finance, and business management.

Figure 10:
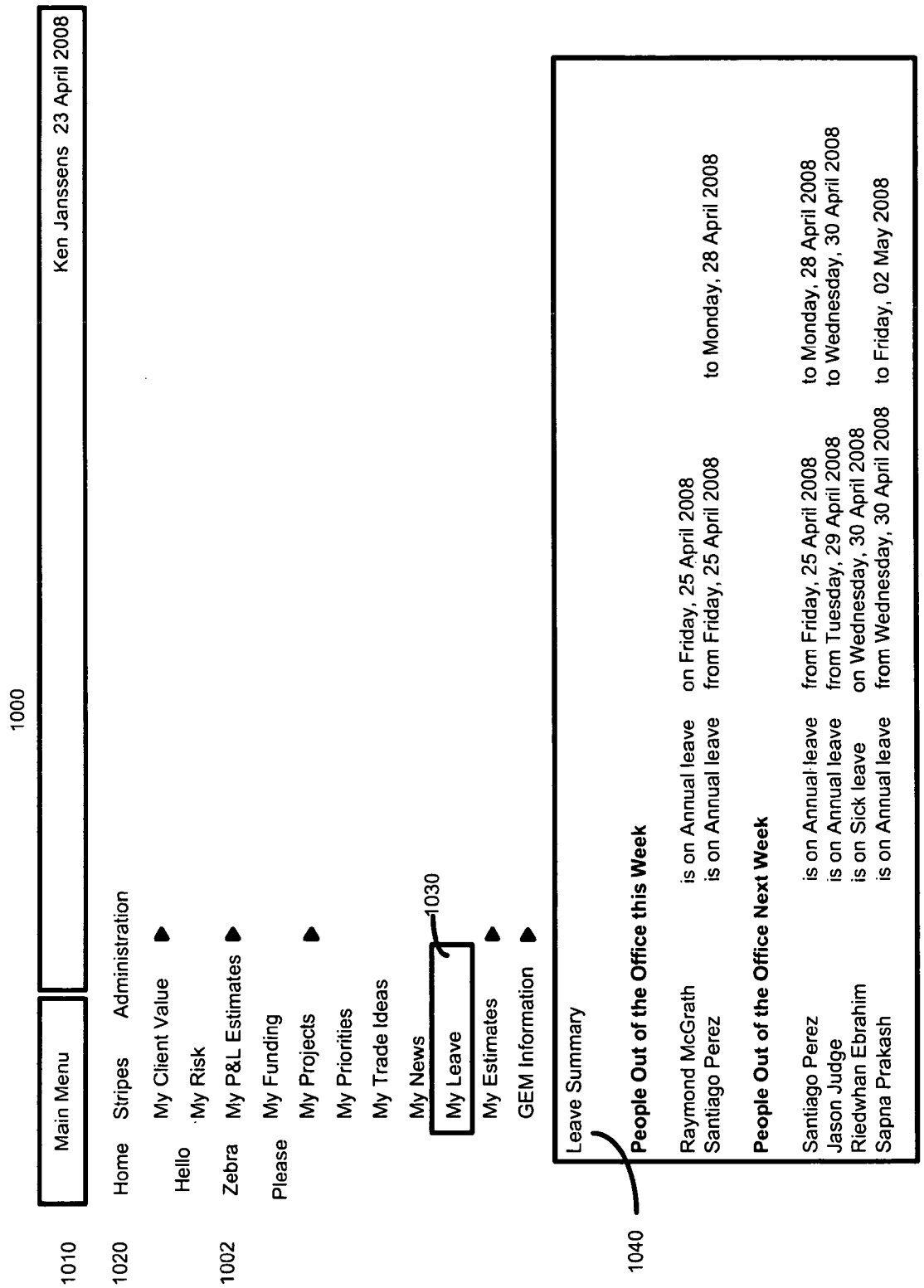
FIG. 10 is a user interface illustrating implementation of a leave module of a trader portal in accordance with an embodiment of the invention.

FIG. 10 is a user interface 1000 illustrating implementation of a leave module 1030 of a trader portal in accordance with an embodiment of the invention. The user interface 1000 may include a main menu 101, a welcome message 1002, and a toolbar 1020 allowing selection of a leave module 1030. Selection of the leave module 1030 allows viewing of a leave summary screen 1040. The leave module 1030 may further allow users to request time off and determine other personnel that will be in or out of the office. Resources accessed by the leave module 1030 would include resources internal to the trade organization.

As illustrated in FIG. 3, other modules may also be included. The risk module 312 may allow for submission of risk estimates and comparison with actual values. The priorities module 318 may allow a trader to prioritize tasks and goals. The trade ideas module 322 may allow a trader to share new ideas with sales or other traders. The trade ideas module 322 may also pull in trade ideas and strategies for the clients and may draw on sources such as Bloomberg, IM, or email. The news module 324 may allow a trader to view news related to various projects of interest. The news may be drawn from external or internal sources or a combination thereof. The estimates module 328 may draw from a calculation source to provide any number of estimates as desired by a trader. The information module 330 may access sources for providing directories, dictionaries, or other types of information resources.

Other modules that may be incorporated include a credit line module for determining trader credit lines and a business today module showing the risks of the day to the client. As set forth above, additional modules may be added to the system as required.

Figure 11:
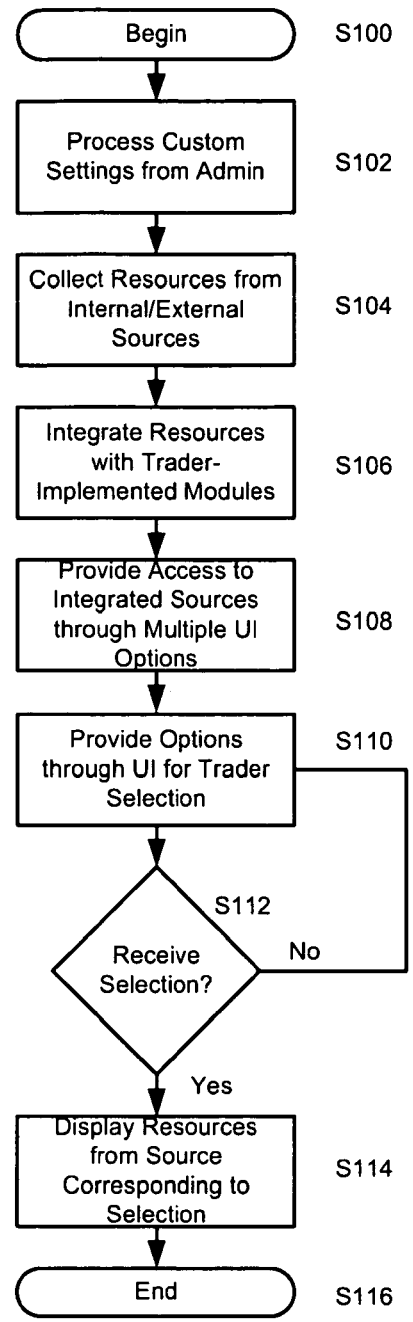
FIG. 11 is a flow chart illustrating a method for operating a trader portal system in accordance with an embodiment of the invention.

FIG. 11 is a flow chart illustrating a method for operating a trader portal system in accordance with an embodiment of the invention. The method begins in S100 and the system processes custom settings for the administrator in S102. These settings may for example determine which resources may be viewed through each trader portal. In S104, the system collects resources from internal and/or external sources. In S106, the system integrates these collected resources with trader implemented modules. In S108, the system provides access to the integrated resources through multiple user interface options. In S110, the system provides options through a UI for trader selection of a module. In S112, if the system receives a selection, it displays resources from the sources corresponding to the selection in S114. The method ends in S116.

Thus, embodiments of the invention relate to a trader portal that allows traders access to multiple distributed systems through a single desktop location. The system is particularly useful for simplifying the daily tasks of traders and reducing unnecessary burden on the systems currently in use, thus creating a competitive advantage.

While particular embodiments of the invention have been illustrated and described in detail herein, it should be understood that various changes and modifications might be made to the invention without departing from the scope and intent of the invention.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

The invention claimed is:

1. A computer-implemented trader portal system for integrating trader related resources, the trader portal system comprising:
   a trader resource integration engine, implementing computer processing components, for automatically integrating trader related resources collected from multiple sources over a plurality of communication channels with the trader portal system in accordance with an administrative configuration;
   a screen configuration engine, implementing computer processing components, for customizing at least one user interface screen with the integrated trader related resources in accordance with trader selections; and
   multiple user interface modules for displaying the integrated trader related resources;
   wherein at least one user interface module of the multiple user interface modules comprises internal and external integrated trader related resources retrieved from at least one internal source disposed inside a trading organization over a first communication channel of the plurality of communication channels and at least one external source disposed external of the trading organization over a second communication channel of the plurality of communication channels in accordance with the customized at least one user interface screen to generate a real-time display;
   wherein, in response to receiving the integrated trader related resources, the trader portal system connects with at least one remote trader computing system and causes a display of the multiple user interface modules at the least one remote trader computing system, said display including the real-time display; and
   wherein the at least one user interface module further integrates a trading functionality of the at least one external source.

2. The system of claim 1, further comprising an entitlement engine for determining entitlements to selected trader related resources for a participating trader.

3. The system of claim 2, wherein the administrative configuration or the trader selections are based on the entitlements determined by the entitlement engine.

4. The system of claim 2, wherein entitlements are customizable by a user or an administrator.

5. The system of claim 1, further comprising a source collection engine, including computer processing components, for collecting trader related resources from the at least one internal and external sources.

6. The system of claim 1, further comprising a source selection engine for selecting trader related resources available to each of a plurality of traders.

7. The system of claim 1, wherein said trading functionality includes a tool.

8. The system of claim 7, wherein the multiple user interface modules comprise at least one of:
   a client value interface module for allowing a trader to view spread, profit, and commission for a particular trade;
   a funding interface module for providing funding data;
   a project interface module that allows a trader to view progress of projects;
   a leave interface module, the leave interface module providing a leave summary screen that allows users to request time off and view scheduling of other personnel;
   a risk interface module allowing for submission of risk estimates and comparison of the risk estimates with actual values;
   a priorities interface module for allowing a trader to prioritize tasks and goals,
   a trade ideas interface module for allowing a trader to share new ideas with other departments and traders;
   a news interface module for allowing a trader to view news related to projects of interest; and
   an information interface module for providing access to directories and dictionaries.

9. A computer-implemented method for providing a trader portal system, the method comprising:
   integrating, using a source integration engine that includes programmed computer processing components, trader related resources collected from multiple sources over a plurality of communication channels with the trader portal system for display in at least one user interface in accordance an administrative configuration;
   customizing, using a screen configuration engine that includes programmed computer processing components, at least one user interface screen with the integrated trader related resources in accordance with trader selections; and
   providing a user with access to the integrated trader related resources by displaying multiple user interface modules for displaying the integrated trader related resources;
   wherein at least one user interface module of the multiple user interface modules comprises integrated trader related resources retrieved from at least one internal source disposed inside a trading organization over a first communication channel of the plurality of communication channels and at least one external source disposed outside of the organization over a second communication channel of the plurality of communication channels in accordance with the customized at least one user interface screen to generate a real-time display;
   wherein, in response to receiving the integrated trader related resources, the trader portal system connects with at least one remote trader computing system and causes a display of the multiple user interface modules at the least one remote trader computing system, said display including the real-time display; and
   wherein the at least one user interface module further integrates a trading functionality of the at least one external source.

10. The method of claim 9, further comprising implementing an entitlement engine for determining entitlements to selected trader related resources for a participating trader.

11. The method of claim 10, wherein the user is provided with access to the integrated trader related resources based at least on entitlements of the user.

12. The method of claim 10, wherein entitlements are customizable by the user or an administrator.

13. The method of claim 9, further comprising implementing a source selection engine for selecting the trader related resources available to the user.

14. The method of claim 9, further comprising implementing a source collection engine for collecting trader related resources from the at least one internal and external sources.

15. The method of claim 9, wherein said trading functionality includes a tool.

16. The method of claim 9, further comprising providing at least one of the following:
- a client value interface module for allowing a trader to view spread, profit, and commission for a particular trade;
- a funding interface module for providing funding data;
- a project interface module that al lows a trader to view progress of projects, a leave interface module, the leave interface module providing a leave summary screen that allows traders to request time off and view scheduling of other personnel;
- a risk interface module allowing for submission of risk estimates and comparison with actual risk figures;
- a priorities interface module for allowing a trader to prioritize tasks and goals;
- a trade ideas interface module for allowing a trader to share new ideas with other departments and traders,
- a news interface module for allowing a trader to view' news related to projects of interest; an information interface module for providing access to directories and dictionaries.

* * * * *